US010786024B2

(12) United States Patent
Pezzimenti

(10) Patent No.: US 10,786,024 B2
(45) Date of Patent: Sep. 29, 2020

(54) MULTILAYERED WATERPROOF MOISTURE MANAGEMENT ATHLETIC GARMENTS

(71) Applicant: NIKE, Inc., Beaverton, OR (US)

(72) Inventor: Luke A. Pezzimenti, Portland, OR (US)

(73) Assignee: NIKE, Inc., Beaverton, OR (US)

(*) Notice: Subject to any disclaimer, the term of this patent is extended or adjusted under 35 U.S.C. 154(b) by 0 days.

(21) Appl. No.: 16/391,454

(22) Filed: Apr. 23, 2019

(65) Prior Publication Data

US 2019/0246722 A1 Aug. 15, 2019

Related U.S. Application Data

(63) Continuation of application No. 15/218,693, filed on Jul. 25, 2016, now Pat. No. 10,327,489, which is a
(Continued)

(51) Int. Cl.
*A41D 31/02* (2019.01)
*A41D 31/12* (2019.01)
*A41D 31/102* (2019.01)
*B32B 38/00* (2006.01)
*B32B 5/02* (2006.01)
(Continued)

(52) U.S. Cl.
CPC ............... *A41D 31/02* (2013.01); *A41D 1/04* (2013.01); *A41D 1/08* (2013.01); *A41D 31/102* (2019.02); *A41D 31/125* (2019.02); *B32B 3/266* (2013.01); *B32B 5/024* (2013.01);

*B32B 27/12* (2013.01); *B32B 27/322* (2013.01); *A41D 2200/20* (2013.01); *A41D 2600/10* (2013.01);
(Continued)

(58) Field of Classification Search
CPC .... A41D 31/02; A41D 31/125; A41D 31/102; B32B 3/266; B32B 38/0004
See application file for complete search history.

(56) References Cited

U.S. PATENT DOCUMENTS 385,306 A 6/1888 Helwitz
4,591,523 A * 5/1986 Thompson ............ A61F 13/511
428/131
(Continued)

FOREIGN PATENT DOCUMENTS

CN 101083919 A 12/2007
WO 9934972 A1 7/1999

*Primary Examiner* — Mark A Osele
*Assistant Examiner* — Christopher C Caillouet
(74) *Attorney, Agent, or Firm* — Shook, Hardy and Bacon LLP

(57) ABSTRACT

A water proof moisture management garment and a method of constructing such a garment in accordance with the present invention utilizes at least three layers. An outer layer may comprise a stretch woven textile treated with a durable water repellant finish. The outer layer may be micro-perforated to permit perspiration to evaporate through the micro-perforations. An inner layer may comprise a moisture management textile to facilitate the transport of perspiration away from the skin of a wearer. An intermediate layer may bond the outer layer to the inner layer. The intermediate layer may provide holes to permit the evaporation of perspiration from the inner layer through the micro-perforations of the outer layer.

12 Claims, 6 Drawing Sheets

Related U.S. Application Data continuation of application No. 13/612,279, filed on Sep. 12, 2012, now Pat. No. 9,420,837.

(60) Provisional application No. 61/533,611, filed on Sep. 12, 2011.

(51) Int. Cl.
| | |
|---|---|
| *A41D 1/04* | (2006.01) |
| *B32B 3/26* | (2006.01) |
| *B32B 27/12* | (2006.01) |
| *B32B 27/32* | (2006.01) |
| *A41D 1/08* | (2018.01) |
| *D06N 3/00* | (2006.01) |

(52) U.S. Cl.
CPC ... *B32B 2307/7265* (2013.01); *B32B 2437/00* (2013.01); *D06N 3/0059* (2013.01)

(56) References Cited

U.S. PATENT DOCUMENTS

| | | |
|---|---|---|
| 5,098,770 A | 3/1992 | Paire |
| 6,263,511 B1 | 7/2001 | Moretti |
| 7,135,424 B2 | 11/2006 | Worley et al. |
| 7,581,248 B2 | 8/2009 | Atkins et al. |
| 2002/0132091 A1 | 9/2002 | Worley |
| 2007/0093162 A1 | 4/2007 | Holcombe et al. |
| 2009/0104734 A1 | 4/2009 | Specht et al. |
| 2010/0242149 A1 | 9/2010 | Mickle et al. |
| 2011/0197331 A1 | 8/2011 | Reynolds |

* cited by examiner

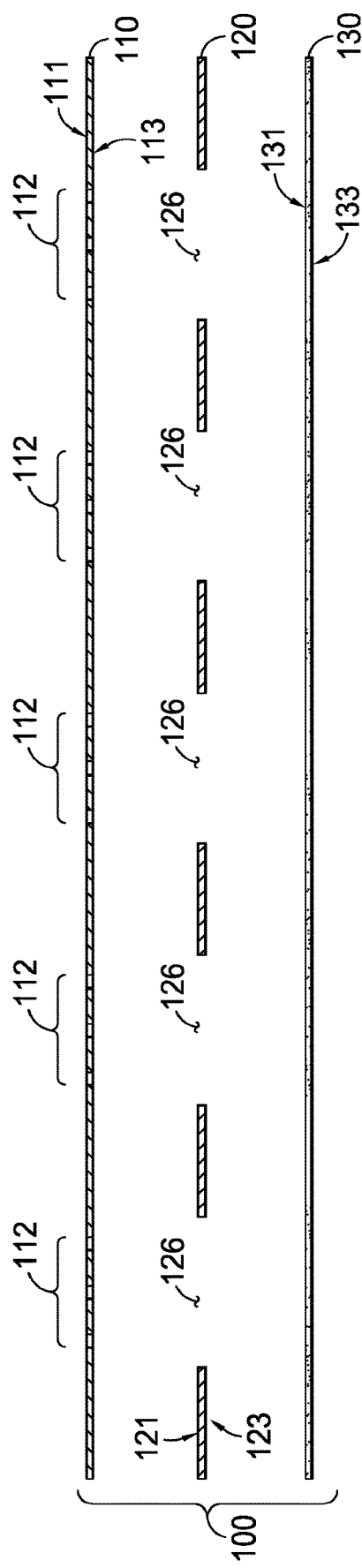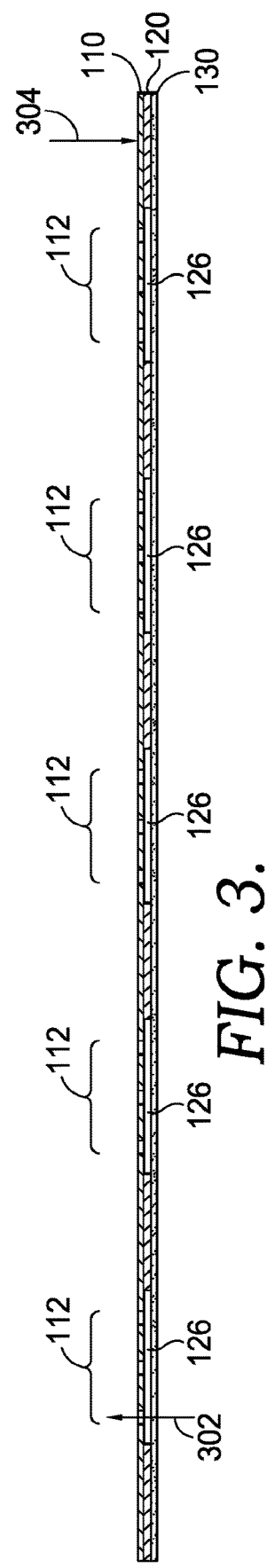

MULTILAYERED WATERPROOF MOISTURE MANAGEMENT ATHLETIC GARMENTS

CROSS-REFERENCE TO RELATED APPLICATIONS

This application having U.S. application Ser. No. 16/391,454, filed Apr. 23, 2019, and entitled "Multilayered Waterproof Moisture Management Athletic Garments," is a continuation application of U.S. application Ser. No. 15/218,693, filed Jul. 25, 2016, and entitled "Multilayered Waterproof Moisture Management Athletic Garments." The '693 application is a continuation application of U.S. application Ser. No. 13/612,279, filed Sep. 12, 2012, and entitled "Multilayered Waterproof Moisture Management Athletic Garments," which issued as U.S. Pat. No. 9,420,837 on Aug. 23, 2016. The '279 application claims the benefit of priority of U.S. Provisional Appl. No. 61/533,611, filed Sep. 12, 2011, and entitled "Multilayered Waterproof Moisture Management Athletic Garments." The entireties of the aforementioned applications are incorporated by reference herein.

TECHNICAL FIELD

The present invention relates to moisture management garments. More particularly, the present invention relates to multilayered water proof moisture management garments, particularly for use in athletic training and/or competition.

BACKGROUND OF THE INVENTION

Athletic competition and training often requires an individual to engage in strenuous activity out of doors during inclement weather. An athlete training or competing during rain, for example, may prefer and even benefit from protection from precipitation, but that same athlete may suffer discomfort or even performance consequences from overheating and discomfort due to accumulated perspiration if they wear typical water protection gear that traps perspiration inside the garment in addition to keeping precipitation outside of the garment. Unfortunately, most apparel that protects a wearer's skin from precipitation also tends to trap that wearer's perspiration within the garment, thereby requiring an athlete to choose between prioritizing protection from precipitation and prioritizing moisture management.

BRIEF SUMMARY OF THE INVENTION

The present invention provides protection from precipitation or other ambient moisture while also providing moisture management by facilitating the evaporation of perspiration from a wearer, such as an athlete engaged in training or competition. In accordance with the present invention, a garment may comprise either an outer layer garment or a base layer garment. Alternatively, a garment in accordance with the present invention may be worn as part of multiple layers of garments. A garment may comprise water resistant outer layer with optional zoned vapor permeability. Water resistance of an outer layer may be provided by inherent properties of a textile or by appropriate treatment of an otherwise non-water resistant textile. The outer layer may, for example, comprise a knit or woven textile treated with a durable water repellant (DWR) finish to provide water resistance, with vapor permeability provided, for example, by micro-perforations formed through the textile. The micro-perforations in the water resistant outer layer may be made in a predetermined configuration to provide zonal vapor permeability, with some regions of the garment having greater vapor permeability than others if desired. Additionally and/or alternatively, vapor permeability may be created by selecting appropriate knit and/or weave properties of the outer layer to provide a desired degree of vapor permeability. The garment may further comprise an inner layer, which may provide moisture management properties, if desired. The inner layer may comprise a moisture management fabric to facilitate the transmission of perspiration across the fabric layer from the wearer's skin to the external side of the inner layer, although any type of textile may be used for inner layer. If moisture management properties are desired, the inner layer may comprise any type of moisture management fabric. Examples of appropriate moisture management fabrics are fabrics that facilitate the movement of perspiration using capillary action, denier differential mechanisms, or other processes. The inner layer and the outer layer may be joined using an intermediate layer, which may be a water resistant or water proof film or a water proof breathable film, such as a PTFE film. The intermediate layer may have a plurality of holes to enhance vapor transport from the inner layer through a vapor permeable portion of the outer layer at locations of the garment where enhanced breathability is desired. For example, the adhesive layer may comprise a grid of adhesive material in a predetermined configuration to form holes or voids corresponding to at least a portion of a plurality of micro-perforations in the outer layer. Alternatively, intermediate layer may comprise a PTFE film, which provides at least some inherent vapor permeability, with an adhesive applied to one or both sides of the PTFE film. Such a PTFE film may have its breathability further enhanced by forming holes at selected locations. Accordingly, in one example, when a garment is assembled from these three layers, vapor and/or perspiration may move away from the skin of an athlete through the inner layer, through the holes of the intermediate layer, and then exit the micro-perforations or inherently open structure of the outer layer, while rain or other precipitation will first encounter the outer layer, which may have water resistant properties, for example either due to its construction or a DWR finish, with an intermediate layer that may possess further water resistant or water proof properties underlying the outer layer. The micro-perforations in the outer layer may be of a size, such as 0.5 millimeters in diameter, that permits water vapor to evaporate through the micro-perforation but that substantially prevents liquid water entering the garment through the micro-perforation. Holes in the intermediate layer and/or micro-perforations in the outer layer may be positioned relative to one another and/or on the finished garment to provide a desired amount of water protection versus vapor permeability at different locations of the garment. In this way, a garment constructed in accordance with the present invention may provide protection from precipitation while also allowing an athlete to regulate his or her body temperature appropriately by permitting the evaporation of perspiration through the garment.

Methods in accordance with the present invention may be used to fabricate a water resistant and vapor permeable garment with optional performance zoning. Methods in accordance with the present invention may comprise steps such as preparing a water resistant outer layer optionally having microperforations or other zoned vapor permeability, preparing an intermediate layer with holes, preparing an inner layer, aligning the layers, which may involve aligning at least some of the holes of the intermediate layer with at least a portion of the micro-perforations of the outer layer, bonding the outer layer to the inner layer using the intermediate layer, and joining the resulting multi-layered piece with other pieces to form a garment.

This section provides a general summary of the disclosure, and is not a comprehensive disclosure of its full scope or all its features. Further areas of applicability will become apparent from the description provided herein. The description and specific examples of the summary are intended for purposes of illustration only and are not intended to limit the scope of the present disclosure.

BRIEF DESCRIPTION OF THE SEVERAL VIEWS OF THE DRAWING

The drawings described herein are for illustrative purposes only of selected examples and not all possible implementations, and are not intended to limit the scope of the present disclosure.

FIG. 2 illustrates a cross-section of the layers of a garment in accordance with the present invention in exploded form.

FIG. 3 illustrates a cross-section of the layers of a garment in accordance with the present invention.

DETAILED DESCRIPTION OF THE INVENTION

Garments in accordance with the present invention may provide a desired amount of water resistance and vapor permeability, with the amount of water resistance versus vapor permeability being capable of varying at different locations of the garment. Accordingly, garments in accordance with the present invention may effectively protect the wearer from falling precipitation while still permitting vapor escape.

Figure 1:
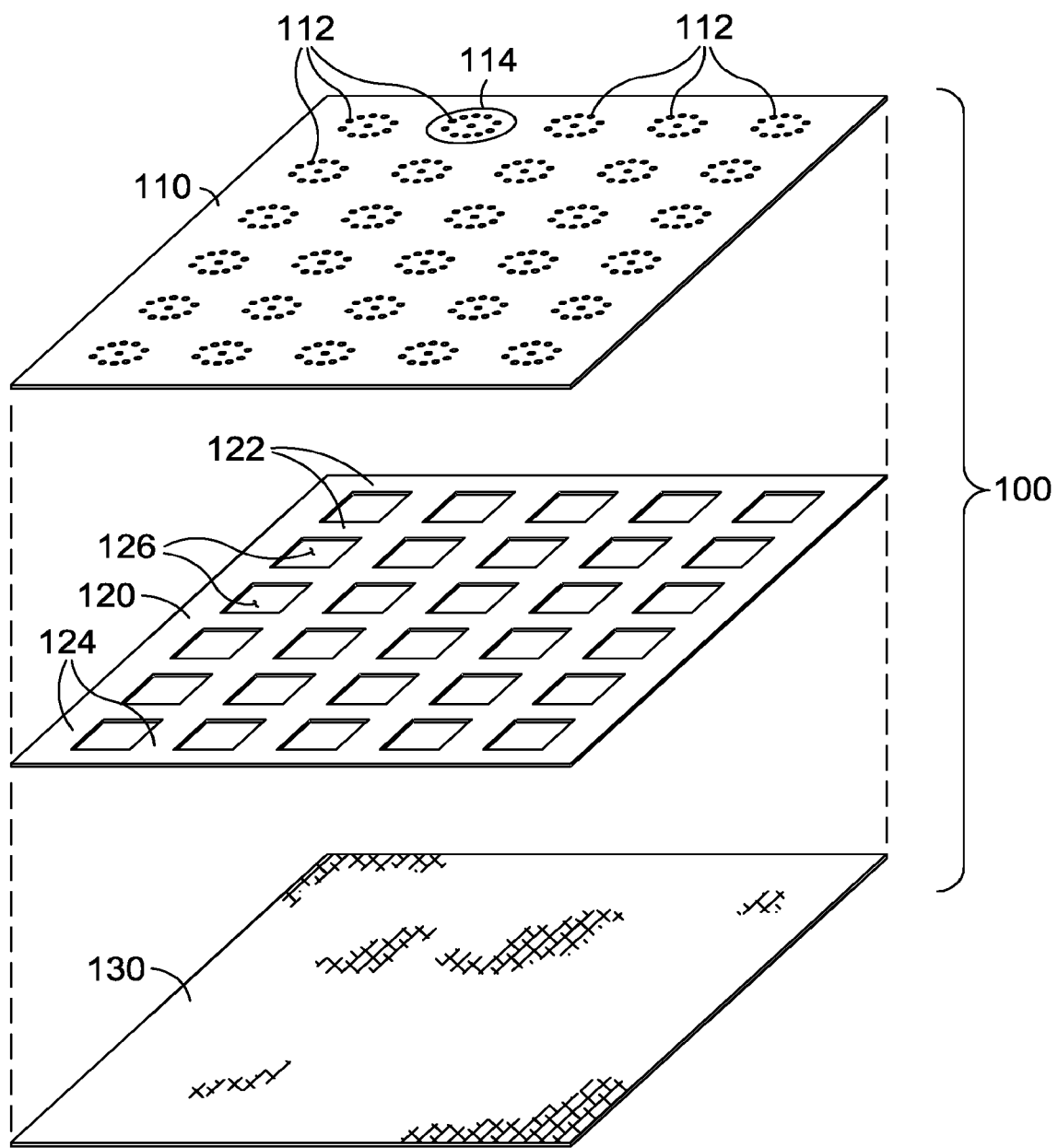
FIG. 1 illustrates the layers of a garment in accordance with the present invention in exploded form.

Referring now to FIG. 1, examples of layers 100 of a garment in accordance with the present invention are illustrated. Outer layer 110, which may be a water resistant layer, may comprise a textile that has been treated or constructed to possess water repellant properties. Outer layer 110 may comprise, for example, a stretch woven textile formed of any type of fiber treated with a durable water repellant finish. Whether worn as an outer layer or a base layer, a stretch woven textile with a DWR finish will possess desirable durability and abrasion resistance. However, any type of knitted or woven textile may be used for outer layer. Outer layer 110 may have formed therein a plurality of micro-perforations 112 to provide vapor permeability, although other methods may be used to provide vapor permeability, such as knit and/or weave selection. The plurality of micro-perforations 112 may be arranged in a predetermined configuration. While FIG. 1 illustrates one example of one configuration of micro-perforations in groups 114 evenly distributed over outer layer 110, other configurations and/or arrangements of micro-perforations may be used. For example, the density of micro-perforations may vary at different locations in a predetermined fashion based, for example, on the amount of vapor permeability and water resistance desired at a given location of a garment. For example, micro-perforations may be larger and/or more numerous per unit area in zones of the garment where higher vapor permeability is desired than in zones where less vapor permeability is desired. Each group 114 of micro-perforations illustrated in FIG. 1 are arranged in a substantially circular fashion, with each group 114 of micro-perforations having a location in a larger regularly spaced grid of circles of micro-perforations. However, other configurations of micro-perforations are within the scope of the present invention. For example, micro-perforations need not be grouped at all, or may be grouped in different numbers and/or shapes. Further, the spacing of micro-perforations and/or groups of micro-perforations may vary over a garment, as may the size and/or shape of the micro-perforations and/or groups of micro-perforations.

Still referring to FIG. 1, an inner layer 130 may comprise a moisture management textile, although any type of textile may be used. The inner layer may comprise a knit textile of polyester or any other type of fiber. One example of an appropriate selection of moisture management textile 130 are textiles that utilize capillary action to move moisture from one side of the textile to the other side of the textile. Another example of an appropriate selection of moisture management textile 130 are textiles constructed with layers having different denier values to create a denier differential from one face of the textile to the other face of the textile that facilitates the movement of moisture across the textile. In some instances, a moisture management textile 130 may primarily transfer moisture in a single direction, in which case a garment in accordance with the present invention the moisture management textile may be oriented to transport moisture toward the outer layer 110 when assembled.

Between outer layer 110 and inner layer 130 is intermediate layer 120, which may comprise an adhesive layer. Intermediate layer 120 may, for example, comprise a heat activated adhesive film that will bond the outer layer 110 to the inner layer 130 when appropriate heat and pressure are applied to the assembled three layers. One example of suitable adhesive films that may be used as intermediate layers are adhesive films available from the Bemis Company. Additionally/alternatively, intermediate layer 120 may comprise a water proof and breathable material, such as a PTFE film, which may have an adhesive applied on one or both sides of the film to facilitate construction as described herein. Intermediate layer 120 may provide water resistance and/or water proof properties where present beneath outer layer 110, as well as enhancing the structural strength of an assembled garment. Intermediate layer 120 may further possess varying degrees of tackiness on one or both faces of the intermediate layer 120 to facilitate the assembly of the layers of the garment prior to applying heat and pressure to activate any adhesive provided in intermediate layer 120 and bond the outer layer 110 to inner layer 130. Intermediate layer 120 may be formed to possess a plurality of holes 126 that correspond to at least a portion of the plurality of micro-perforations 112 formed in outer layer 110 when the layers 100 are fully assembled. In the example illustrated in FIG. 1, this configuration is achieved by, for example, die cutting a plurality of holes 126 in a substantially grid-like fashion in intermediate layer 120, thereby leaving a plurality of horizontal sections 122 and a plurality of vertical sections 124 to form the bond between outer layer 110 and inner layer 130. While the example of FIG. 1 illustrates plurality of holes 126 as being substantially square and repeating in a regular fashion, other shapes and/or spacings of holes are within the scope of the present invention. For example, fewer or even no holes may be provided for areas of a garment likely to require a high amount of strength and/or water proofness, such as for a hood or shoulder area where precipitation is particularly likely to strike. The presence of a plurality of holes 126 creates sections of an assembled garment from layers 100 where outer layer 110 is not bonded to inner layer 130, such that at least a portion of micro-perforations 112 may permit perspiration transported through inner layer 130 to evaporate, thereby assisting the wearer in regulating his or her temperature.

Referring now to FIG. 2, a cross-section of layers 100 is illustrated to further depict an example of the present invention. Inner layer 130 possesses both a skin facing side 133 and an outer facing side 131. Particularly for use in base layer garments, inner layer 130 may optionally, possess moisture management properties. Whether a moisture management inner layer 130 transports moisture via capillary action, denier differential mechanisms, or other mechanisms, perspiration will be moved from skin facing side 133 to outer facing side 131 of inner layer 130. The plurality of holes 126 formed in intermediate layer 120 provide openings for perspiration to evaporate from inner layer 130 through outer layer 110 via the micro-perforations 112.

Still referring to FIG. 2, outer layer 110 may have an outer face 111 and an inner face 113. A water resistant treatment, such as a DWR finish, may be applied to only outer face 111 or to both outer face 111 and inner face 113. While water resistant treatment may be applied to only inner face 113, such an approach could permit outer layer 110 to absorb some moisture and thereby increase the weight of a garment upon the athlete.

Still referring to FIG. 2, intermediate layer 120 may possess an inner face 123 and an outer face 121. It should be noted that in the example illustrated in FIG. 2, a cross-section of intermediate layer 120 is illustrated to indicate some of the plurality of holes 126, thereby revealing only a portion of the intersecting grid of sections of adhesive layer 120 illustrated in FIG. 1. One or both of outer face 121 and inner face 123 may be sufficiently tacky to be temporarily or even permanently engaged to either outer layer 110 or inner layer 130 during garment assembly. For example, outer face 121 of intermediate layer 120 may comprise a PTFE film with a glue or other adhesive applied to it so that intermediate layer 120 may be initially adhered to outer layer 110 to assure that holes 126 of intermediate layer 120 are appropriately aligned with at least a portion of the plurality of micro-perforations 112 in outer layer 110. Holes 126 must be aligned with at least a portion of micro-perforations 112 to permit perspiration transported through moisture management inner layer 130 and other vapor to evaporate through micro-perforations 112 of outer layer 110 to enhance the comfort and performance of the wearer. Optionally, outer layer 110 may have a plurality of micro-perforations 112 with only a subset of that plurality of micro-perforations 112 corresponding to the plurality of holes 126 of intermediate layer 120. Such an approach would facilitate the construction of a garment in accordance with the present invention by simplifying the alignment of the holes of the intermediate layer 120 with the micro-perforations of the outer layer 110, but could also require a larger number of micro-perforations in outer layer 110 to ensure that at least some micro-perforations are aligned with holes 126.

Referring now to FIG. 3, the assembled layers 100 are illustrated. As shown in FIG. 3, outer layer 110 has been bound to inner layer 130 using intermediate layer 120 as an adhesive. Heat and pressure may be applied to layers 100 to form a bond between outer layer 110 and inner layer 130 using adhesives provided with intermediate layer 120. As illustrated in FIG. 3, the plurality of micro-perforations 122 are aligned with the plurality of holes 126 to permit perspiration to move across inner layer 130 through holes 126 and to evaporate through micro-perforations 112, as indicated by perspiration movement arrow 302. However, the water resistance, such as durable water resistance treatment, applied to outer layer 110 prevents rain or other precipitation from moving past outer layer 110, as indicated by precipitation movement arrow 304. Micro-perforations 112 may be of a variety of sizes, dimensions, and spacings, but if the micro-perforations 112 are sufficiently small, such as having a diameter of approximately 0.5 millimeters, such micro-perforations 112 will not permit liquid water to penetrate through outer layer 110 in any substantial amount. Accordingly, the layers of garment illustrated in FIG. 3 permit perspiration to evaporate from the skin of a wearer, as indicated by arrow 302, while preventing precipitation from reaching the skin of a wearer, as indicated by arrow 304.

Figure 4:
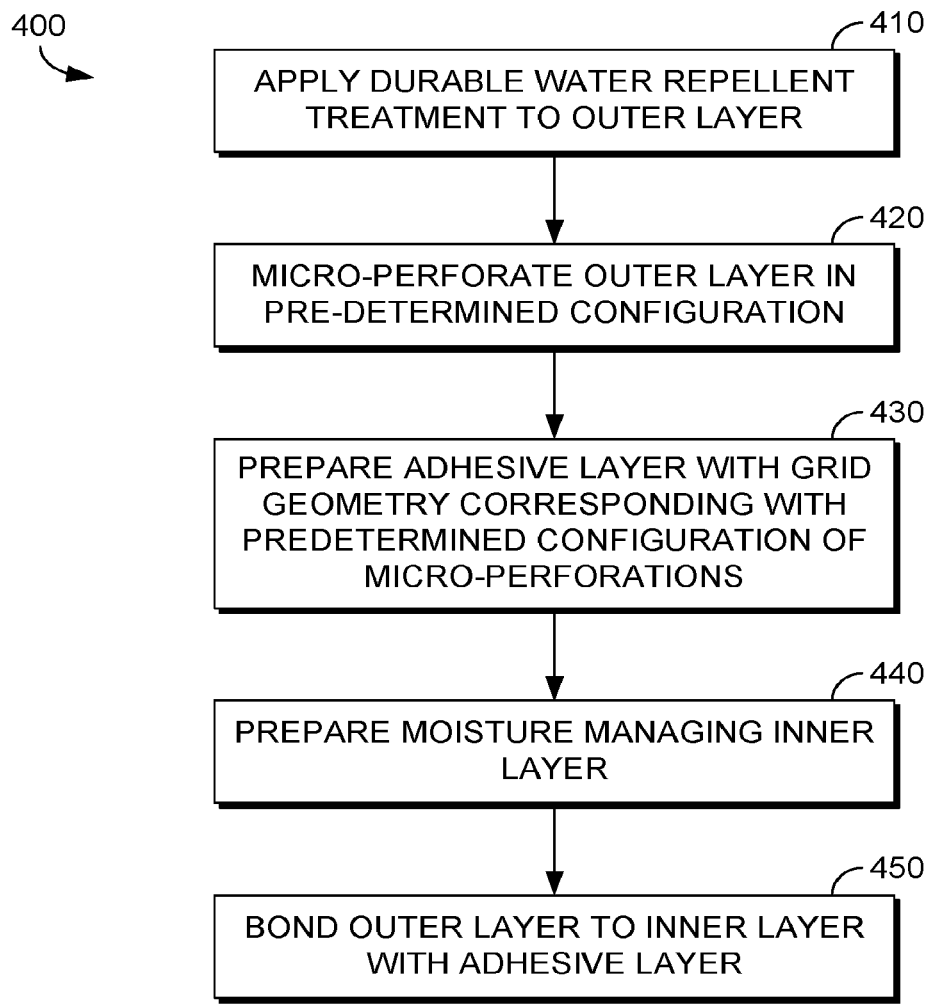
FIG. 4 illustrates an example of a method of constructing a garment in accordance with the present invention.

Referring now to FIG. 4, a method 400 of constructing a water proof moisture management garment in accordance with the present invention is illustrated. Method 400 begins by applying a durable water repellant treatment to an outer layer. The outer layer of a garment in accordance with the present invention may, for example, comprise a stretch woven fabric. In step 420, the outer layer may be micro-perforated in a predetermined configuration. The predetermined configuration of micro-perforations applied in step 420 may permit at least a portion of the micro-perforations to receive evaporated perspiration through the other layers of the garment, as previously described. In step 430, an adhesive intermediate layer may be prepared with a grid geometry corresponding with the predetermined configuration of micro-perforations. As described above, the geometry of the adhesive intermediate layer may provide holes that correspond to at least a portion of the micro-perforations of the outer layer. As also described above, not all micro-perforations in the outer layer need correspond to a hole in the adhesive intermediate layer. In step 440, a moisture managing inner layer may be prepared. One example of an appropriate moisture management layer is DRI-FIT textiles used in clothing sold by Nike, Inc. The inner layer may comprise a knit fabric that transports moisture from an inner skin facing side to an outer face via capillary action, denier differential mechanisms, or any other process. In step 450, the outer layer may be bonded to the inner layer using the adhesive intermediate layer. Step 450 may comprise applying heat and pressure to the stacked layers to activate the adhesive intermediate layer. Step 450 may be facilitated by a substep of using one or more tacky sides of the adhesive intermediate layer to temporarily affix the adhesive intermediate layer to one or both of the outer layer and the inner layer. For example, one face of the adhesive intermediate layer may have a glue applied to it that will permit the adhesive intermediate layer to be temporarily adhered to the outer layer, for example after a backing has been removed to expose the glue. Such a temporary application may facilitate the alignment of holes in the adhesive intermediate layer with at least a portion of the plurality of micro-perforations in the outer layer. Once the holes of the adhesive intermediate layer are appropriately aligned with the micro-perforations of the outer layer, a moisture management textile comprising the inner layer may be positioned, and then the entire assembly may be treated using a heat press.

The steps illustrated in FIG. 4 may be performed in different orders or simultaneously. Further, additional steps may be added to the method without departing from the scope of the present invention. For example, additional steps of cutting, stitching, and joining portions of a garment may be added without departing from the scope of the present invention.

Figure 5:
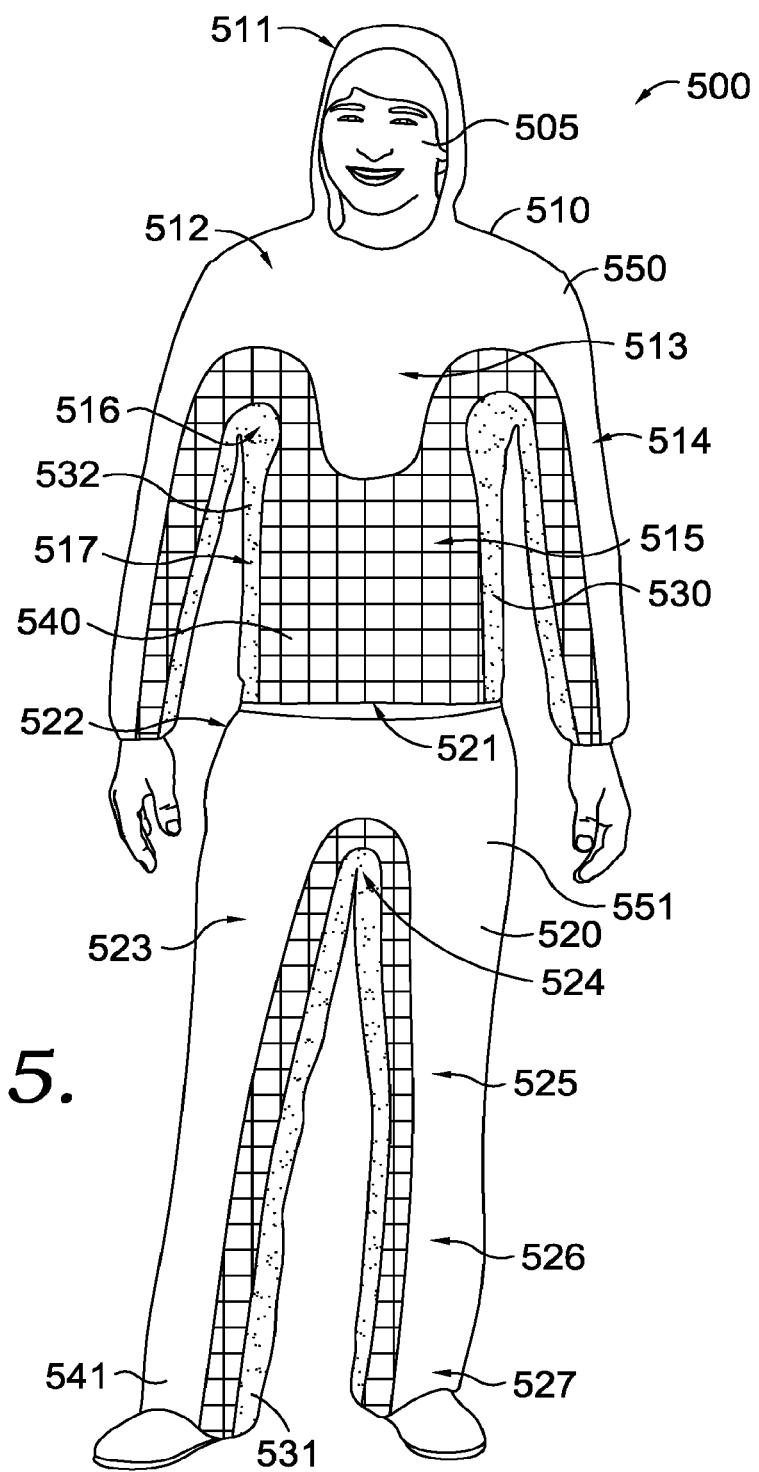
FIG. 5 illustrates examples of garments in accordance with the present invention.

Referring now to FIG. 5, example of garments 500 in accordance with the present invention are illustrated. In the example of FIG. 5, wearer 505 may be an athlete or other individual, and may be participating in athletic training and/or competition during inclement weather. Garments 500 may comprise, but need not be limited to, an upper garment 510 and a lower garment 520. In the example of FIG. 5, upper garment 510 comprises a hooded shirt, while lower garment 520 comprises pants. Upper garment 510 may provide one or more of a hood 511, a shoulder section 512, a chest section 513, arm sections 514, a mid section 515, an underarm section 516, and a side section 517. Lower garment 520 may provide one or more of a waist section 521, a hip section 522, a thigh section 523, a crotch section 524, a knee section 525, a lower leg section 526, and an ankle section 527. Of course, garments in accordance with the present invention may cover additional sections of a wearer's body and/or fewer sections of a wearer's body. As explained herein, different sections of a garment may fact different exposures to precipitation and/or have different vapor permeability needs.

FIG. 5 further illustrates the zonal attributes possible for garments in accordance with the present invention. For example, if an athlete 505 is wearing garments 500 during rain, the wearer 505 may particularly desire protection from water falling from above while still desiring ventilation for purposes of evaporating perspiration in areas of his or her body less likely to be impacted by falling precipitation. Accordingly, vapor permeable zones 530 may provide the highest degree of vapor permeability of a garment, for example, by providing micro-perforations corresponding, at least in part, to holes of an underlying intermediate layer, as further described herein. Such a vapor permeable zone 530 would still provide resistance to water, but would permit the ready evaporation of perspiration from inside the garment 510, 520. Even if an outer layer of a garment has a limited degree of vapor permeability prior to the forming of micro-perforations, the formation of micro-perforations in a zone 530 may enhance the breathability and vapor permeability of particular zones of a garment wherein perspiration may be anticipated to be greatest and/or the risk of becoming wet due to precipitation is lowest.

An intermediate breathability section 540 may comprise, for example, one or more regions of a garment wherein an intermediate layer still provides holes to permit a limited amount of vapor permeability through an outer layer without forming micro-perforations in that outer layer. An intermediate vapor permeability region 540 may, for example, correspond to areas of a garment that, when worn, may benefit from a degree of breathability and are not subjected to the most extreme risk of becoming wet due to precipitation, etc., but that would still benefit from enhanced water resistance.

A third highly water resistant area 550 may be formed, for example, at the regions of a garment for which maximum water resistance is desired. For example, a highly water resistant region 550 may be located at the shoulders, head, thigh, or other areas of a garment that may reasonably be anticipated to experience the greatest contact from falling precipitation. Zones 550 may be formed from a water resistant outer layer with no additional micro-perforation, an intermediate layer with no holes provided, and, optionally, an inner layer that may possess moisture management properties or otherwise provide comfortable skin-facing contact. In this fashion, a desired amount of vapor permeability may be attained in regions of a garment requiring a degree of water resistance but less than other areas of a garment. Meanwhile, areas of a garment requiring a high degree of water proofness may have a correspondingly high degree of resistance to penetration by water. By varying the number of holes in an adhesive layer, the size of holes in an adhesive layer, the size and amount of micro-perforations formed in an outer layer, the arrangement of holes and corresponding micro-perforations, and/or the moisture transporting properties of an inner layer, the desired properties of a garment may be achieved in a way that varies at different locations of a garment. Properties desired in a garment in accordance with the present invention may vary based upon the type of garment, the type of activity to be engaged in while wearing the garment, the preferences of a person wearing the garment, etc.

Figure 6:
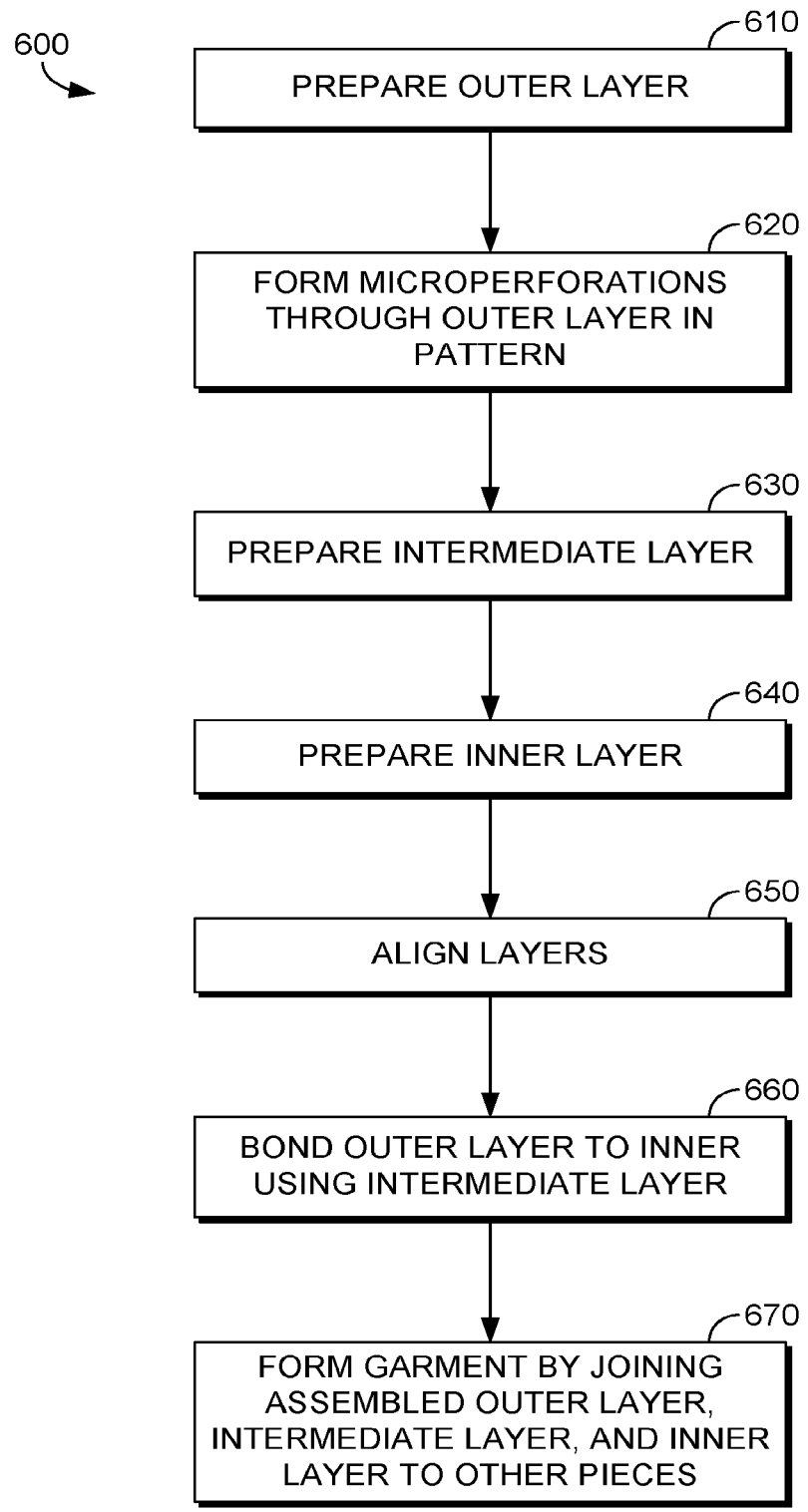
FIG. 6 illustrates a further method in accordance with the present invention.

Referring now to FIG. 6, a method 600 in accordance with the present invention for constructing a water resistant and vapor permeable garment is illustrated. In step 610, an outer layer may be prepared. The outer layer prepared in step 610 may be, for example, a woven or knit textile possessing water resistance. Step 610 may involve sub-steps such as treating a knit or woven textile with a durable water repellant, forming a textile of inherently water resistant fibers, and cutting or otherwise forming a water repellant layer to a desired size and shape. In step 620, micro-perforations may optionally be formed through the outer layer in a desired pattern. Step 620 may be omitted if the knit, weave, or other characteristics of the outer layer prepared in step 610 provides sufficient vapor permeability for the garment intended to be constructed via method 600. The forming of micro-perforations in step 620 may be accomplished in a variety of ways, such as through use of a laser, a physical cutting press or die, or any other methodology. As explained further below, step 620 may form one or more micro-perforations with a directional quality to further facilitate in providing desired vapor permeability of the resulting garment while orienting the micro-perforation in a fashion that may resist penetration by water, such as falling precipitation.

In step 630, an intermediate layer may be prepared. Step 630 may form holes that, when the garment is assembled, will correspond to at least some of the micro-perforations optionally formed in step 620, if such micro-perforations were indeed formed. The intermediate layer prepared in step 630 may, for example, comprise a water proof or water resistant film that will provide additional water resistance and/or strength and physical integrity to the assembled garment. Step 630 may involve cutting or otherwise forming an intermediate layer to a size and shape desired for the assembly process, such as corresponding roughly to the size and shape of the outer layer prepared in step 610. Holes may be formed by any appropriate mechanism, such as die-cutting.

In step 640, an inner layer may be prepared. Step 640 may comprise cutting or otherwise forming a textile, such as a moisture management textile, to a desired size and/or shape, for example, a size and shape corresponding to the outer layer formed in step 610 and/or the intermediate layer formed in step 630. Step 640 may further comprise orienting a moisture management textile used as an inner layer in a proper fashion to transport water from the skin-facing side of the moisture management layer to the outer layer side of the moisture management textile when a garment is worn. Such orientation of the inner layer in step 640 may be particularly valuable if moisture management layer is a textile such as a denier differential textile that preferentially transports moisture in a single direction across the width of the textile.

In step 650 the layers prepared in step 610, step 630, and/or step 640 may be aligned. For example, in step 650 holes formed in intermediate layer may be aligned with micro-perforations formed in outer layer. In step 660, the outer layer and the inner layer may be bound together using the intermediate layer. Step 660 may comprise, for example, using a heat press to activate an adhesive film to bond the outer water repellant layer to the inner moisture management layer using the water proof adhesive layer.

In step 670 a garment in accordance with the present invention may be formed by joining the assembled outer layer, intermediate layer, and inner layer formed in steps 610-660 to other pieces to form a completed garment. The other pieces used to join to the assembled layers may comprise similar layered pieces or other types of pliable materials used to form a garment, such as a jacket, shirts, pants, shorts, etc., to be worn by an individual. Any one or more joining technologies may be used in step 670, such as stitching, gluing, seam taping, adhesives, rivets, or other mechanisms to structurally join multiple pieces together to form a single garment.

The steps of method 600 may be performed in different orders than those described herein. Further, different steps of method 600 may be performed in parallel, or omitted altogether. If a garment is to be formed of multiple layered pieces having different water resistance and vapor permeability properties, steps 610-660 may be performed for each piece.

Figure 7:
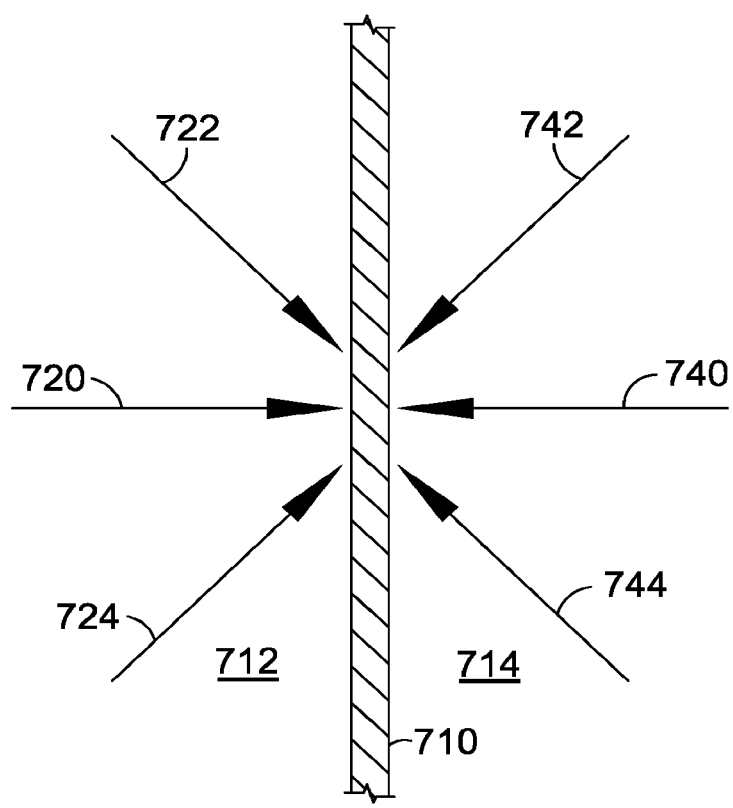
FIG. 7 illustrates examples of directionally oriented micro-perforations that may be used in garments in accordance with the present invention.

Referring now to FIG. 7, the directional possibilities of forming a micro-perforation in another layer 710 are illustrated. As shown in FIG. 7, relative to outer layer 710 there may be an outside 712 corresponding to the side of the water resistant layer 710 facing away from the wearer of a garment and an inside 714 corresponding to the side of the outer layer 710 facing toward the wearer of a garment. While a variety of technologies may be used to create micro-perforations, such as lasers, that do not provide any sort of a lip or other contour in the resulting micro-perforation, other methodologies may provide a physical dimensionality to a resulting micro-perforation. For example, if a spike, die, or other puncturing structure is used to form a micro-perforation, the outer layer 710 textile may have a lip or other slight protrusion corresponding to the direction with which the micro-perforation was formed. For example, a micro-perforation may be formed by applying a die or other physical cutting device from the outside 712 of the outer layer 710. A cutting implement may be directed to the outer layer 710 directly perpendicular to the surface 720, at an angle coming from above relative to when the garment will be worn 722, or from below 724. Depending upon what region of a garment a micro-perforation is to be located at on a garment, different orientations of a micro-perforation may be preferable or undesirable. For example, in some locations puncturing angle 722 may effectively funnel water running down a garment into the interior of a garment, and might be undesirable, while in other locations such an orientation might be preferable as facilitating evaporation of perspiration while not being located at a position that is likely to receive precipitation directly or indirectly.

FIG. 7 further illustrates various directional punctures that may be made to form a micro-perforation through outer layer 710 from what will ultimately be the inside 714 of a garment. For example, a perpendicular angle 740 may be used to form a micro-perforation, an approach from above perpendicular 742 may be used, or an approach from below perpendicular 744 may be used. Once again, it may be preferable to use an approach from the inside 714 rather than the outside 712 in some circumstances, such as to provide a structure to a micro-perforation to facilitate the shedding of water that might be running down or striking outer layer 710 when a garment is worn. For example, micro-perforation angle 742 may be desirable if some vapor permeability is desired such that a micro-perforation is desired in a region, but at the same time the resulting micro-perforation from puncture angle 742 may provide sufficient overhang that precipitation traveling down the outside 712 face of outer layer 710 will not be funneled into the inside 714 and, in fact, may be shed by any lip or other edge formed for a micro-perforation created using angle 742.

Further, garments in accordance with the present invention may have additional layers beyond those described herein. Also, garments in accordance with the present invention may be constructed using varying textiles, films, and/or water proofing treatments. The configurations, sizes, spacing, and arrangements of micro-perforations and/or holes may vary from the examples illustrated herein.

The foregoing description of examples of the present invention have been provided for purposes of illustration and description. It is not intended to be exhaustive or to limit the invention. Individual elements or features of a particular example are generally not limited to that particular example, but, where applicable, are interchangeable and may be used in a selected example, even if not specifically shown or described.

What is claimed is:

1. A method for fabricating a garment comprising:
preparing a knit textile having an inherently open structure to predetermined dimensions;
applying a durable water-repellant to at least one surface of the knit textile;
preparing a water-proof film to predetermined dimensions;
forming a plurality of holes through the water-proof film in a first area of the water-proof film, wherein the plurality of holes are absent from a second area of the water-proof film;
aligning the knit textile with the water-proof film and bonding the knit textile to the water-proof film so that the at least one surface of the knit textile to which the durable water-repellant is applied faces away from the water-proof film; and
forming the garment using the knit textile bonded to the water-proof film, wherein the knit textile forms an exterior layer of the garment when the garment is worn.

2. The method for fabricating the garment of claim 1, wherein subsequent to the garment being formed, the garment comprises a moisture vapor-permeable and water-resistant zone located at a first portion of the garment, the moisture vapor-permeable and water-resistant zone comprising the knit textile and the first area of the water-proof film having the plurality of holes.

3. The method for fabricating the garment of claim 2, wherein subsequent to the garment being formed, the garment comprises a water-resistant zone located at a second portion of the garment, the water-resistant zone comprising the knit textile and the second area of the water-proof film from which the plurality of holes are absent.

4. The method for fabricating the garment of claim 3, wherein the garment comprises a garment for an upper-torso of a wearer.

5. The method for fabricating the garment of claim 4, wherein the second portion of the garment comprises a shoulder region of the garment.

6. The method for fabricating the garment of claim 3, wherein the garment comprises a garment for a lower-torso of a wearer.

7. The method for fabricating the garment of claim 6, wherein the second portion of the garment comprises a thigh area of the garment.

8. A method for fabricating a garment comprising:
preparing a woven textile having an inherently open structure to predetermined dimensions;
applying a durable water-repellant to at least one surface of the woven textile;
preparing a water-proof film to predetermined dimensions;
forming a plurality of holes through the water-proof film in a first area of the water-proof film, wherein the plurality of holes are absent from a second area of the water-proof film;
aligning the woven textile with the water-proof film and bonding the woven textile to the water-proof film so that the at least one surface of the woven textile to which the durable water-repellant is applied faces away from the water-proof film; and
forming the garment using the woven textile bonded to the water-proof film, wherein the woven textile forms an exterior layer of the garment when the garment is worn.

9. The method for fabricating the garment of claim 8, wherein subsequent to the garment being formed, the garment comprises a moisture vapor-permeable and water-resistant zone located at a first portion of the garment, the moisture vapor-permeable and water-resistant zone comprising the woven textile and the first area of the water-proof film having the plurality of holes.

10. The method for fabricating the garment of claim 9, wherein subsequent to the garment being formed, the garment comprises a water-resistant zone located at a second portion of the garment, the water-resistant zone comprising the woven textile and the second area of the water-proof film from which the plurality of holes are absent.

11. The method for fabricating the garment of claim 8, wherein the water-proof film comprises a polytetrafluoroethylene (PTFE) film having an adhesive on at least one surface.

12. The method for fabricating the garment of claim 11, wherein the plurality of holes are formed by a die-cutting process.

* * * * *